United States Patent [19]

DuBrucq

[11] Patent Number: 4,520,501

[45] Date of Patent: May 28, 1985

[54] SPEECH PRESENTATION SYSTEM AND METHOD

[75] Inventor: Denyse C. DuBrucq, Arlington, Va.

[73] Assignee: Ear Three Systems Manufacturing Company, Arlington, Va.

[21] Appl. No.: 605,978

[22] Filed: Apr. 30, 1984

Related U.S. Application Data

[63] Continuation of Ser. No. 435,345, Oct. 18, 1982, abandoned, which is a continuation-in-part of Ser. No. 365,772, Apr. 5, 1982, abandoned.

[51] Int. Cl.³ .............................................. G01L 1/00
[52] U.S. Cl. ........................................ 381/48; 381/44; 340/407
[58] Field of Search ...................... 381/41–53; 340/407, 371; 364/513, 513.5; 434/112–116

[56] References Cited

U.S. PATENT DOCUMENTS

| | | |
|---|---|---|
| 1,531,543 | 3/1925 | Cooper . |
| 1,738,289 | 12/1929 | Fletcher . |
| 2,703,344 | 3/1955 | Anderson ............................. 179/107 |
| 3,108,268 | 10/1963 | Uttal . |
| 3,626,607 | 12/1971 | Schwake ............................. 35/35 A |
| 3,662,374 | 5/1972 | Harrison et al. . |
| 3,713,228 | 1/1973 | Mason . |
| 3,793,471 | 2/1974 | Mason et al. ........................ 35/35 A |
| 3,866,020 | 2/1975 | Charlesworth .............. 235/61.11 D |
| 3,881,059 | 4/1975 | Stewart .............................. 179/1 SP |
| 4,104,625 | 8/1978 | Bristow et al. . |
| 4,191,945 | 3/1980 | Hannen et al. ...................... 340/407 |
| 4,215,490 | 8/1980 | Fewell . |
| 4,237,449 | 12/1980 | Zibell ................................. 340/407 |
| 4,250,637 | 2/1981 | Scott .................................. 434/114 |
| 4,284,846 | 8/1981 | Marley .............................. 179/1 SE |
| 4,297,677 | 10/1981 | Lewis et al. ........................ 340/148 |
| 4,310,315 | 1/1982 | Frank et al. ........................ 434/114 |

Primary Examiner—E. S. Matt Kemeny
Attorney, Agent, or Firm—Kerkam, Stowell, Kondracki & Clarke

[57] ABSTRACT

A speech presentation method and apparatus which afford a dual multiple point matrix presentation of speech as patterns of points corresponding to codes representing speech phonemes and the characteristic mouth formations that produce the phonemes. Spatial patterns may be presented in either tactile or visual form, or both, from the output of a microcomputer speech analyzer that analyzes speech in real time, from a keyboard that generates phoneme- and mouth form-representing signals, or from a memory device that reproduces pre-recorded spatial patterns. The speech analyzer may be incorporated into an armband with a pair of tactile stimulator matrices to provide an unobtrusive prosthetic device for heating-handicapped individuals. A modified 16 mm projector records spatial patterns on punched film and projects the patterns onto a display to provide a visual presentation.

54 Claims, 24 Drawing Figures

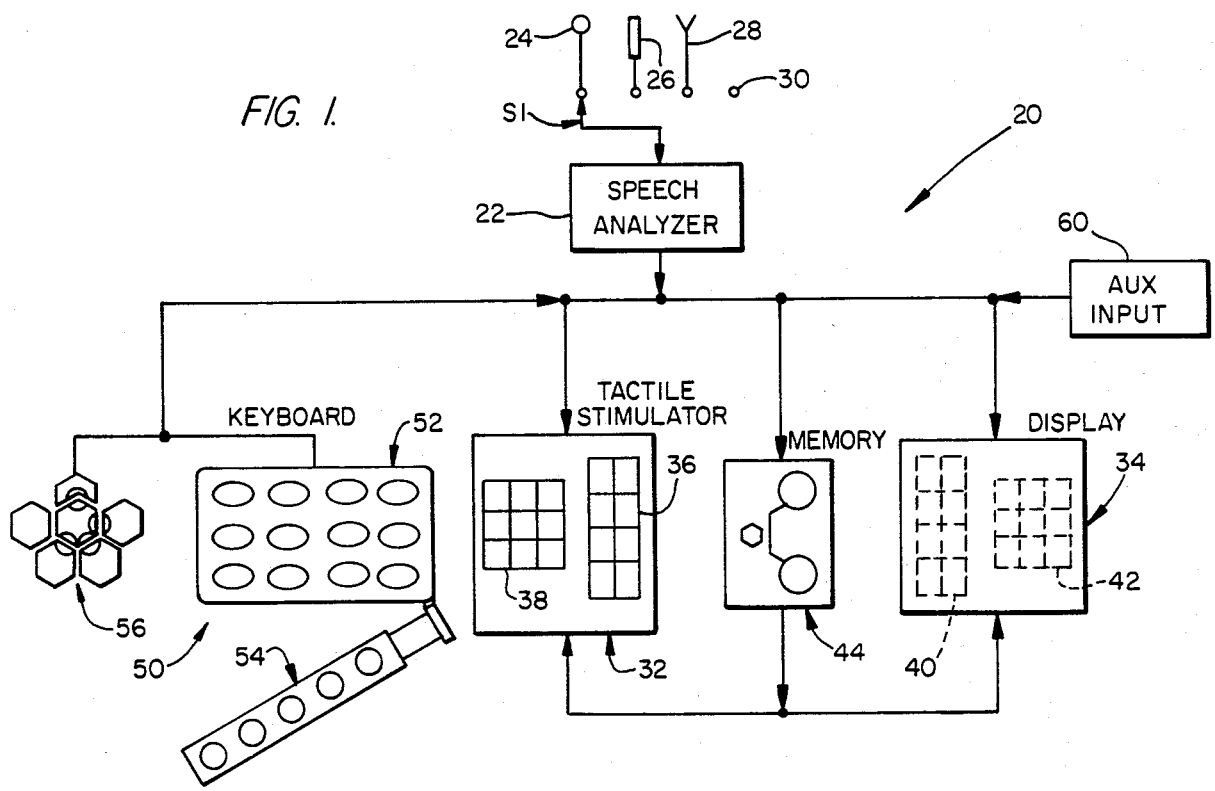

SPEECH PRESENTATION SYSTEM AND METHOD

This application is a continuation of copending Ser. No. 435,345, filed Oct. 18, 1982, which is a continuation-in-part of prior Application Ser. No. 365,772, filed Apr. 5, 1982 both abandoned.

BACKGROUND OF THE INVENTION

This invention relates generally to speech simulation systems and methods, and more particularly to a system and method for presenting simulated speech in a sensory perceptible form to substitute for or to augment hearing.

Various devices and methods are known for assisting hearing-handicapped individuals to receive speech. Sound amplifying devices, such as hearing aids, may be capable of affording a satisfactory degree of hearing to some with a hearing impairment. Devices capable of presenting speech in a visual or tactile form have also been proposed. However, these devices typically present speech on the basis of its frequency content, and, in general, they are more useful for mimicking speech (as for speech therapy purposes) than for interpreting speech. Consequently, they are not very useful for assisting hearing-handicapped persons to communicate naturally in a hearing environment.

For the deaf or those with severe hearing impairments no means is available that enables them to receive conveniently and accurately speech with the speaker absent from view. With the speaker in view, a deaf person can speech read, i.e., lip read, what is being said, but often without a high degree of accuracy. Also, the speaker's lips must remain in full view to avoid loss of meaning. Improved accuracy can be provided by having the speaker "cue" his speech using Cued Speech hand forms and hand positions to convey the phonetic sounds in the message. The hand forms and hand positions convey approximately 40% of the message and the lips convey the remaining 60%. An AutoCuer, under development by R. Orin Cornett, the originator of Cued Speech, can present the hand form and hand position cues for the speaker, but to use the device the speaker's face must still be in view.

The speaker may also convert the message into a form of sign language understood by the deaf person. This can present the message with the intended meaning, but not with the choice of words or expression of the speaker. The message can also be presented by fingerspelling, i.e., "signing" the message letter-by-letter as in Braille, or, of course, the message can be written out and presented.

Such methods of presenting speech require the visual attention of the hearing-handicapped person which, in the long run, can visually handicap the person because his or her visual habits become trained to favor communication rather than observation. Moreover, speech presentation methods such as Cued Speech, sign language and finger-spelling are not practical in an everyday hearing environment since they require specially trained speakers.

SUMMARY OF THE INVENTION

It is desirable to provide a speech simulation method and apparatus which avoid the foregoing disadvantages and which enable hearing-handicapped persons to receive and interpret speech conveniently and accurately in a normal hearing environment. The invention accomplishes this admirably by affording a sensory perceptible presentation of simulated speech and other sounds that is reliable, accurate and easy to interpret, and which can substitute for or augment hearing.

Briefly stated, in accordance with one aspect of the invention, speech is separated into constituent phonemes. Each phoneme is associated with a characteristic mouth form that produces the phoneme. The phonemes and mouth forms are encoded as distinctive spatial patterns; and the spatial patterns are presented in a sensory perceptible form.

In accordance with another aspect, a sequence of signals representative of speech phonemes and characteristic mouth forms that produce such phonemes is produced. The signals are encoded as distinctive spatial patterns, and the spatial patterns are presented in a sensory perceptible form.

In yet another aspect, the invention provides a speech simulation apparatus that comprises means for producing a sequence of signals representative of speech, first and second arrays of tactile stimulators adapted to be positioned at opposed locations on a human limb to provide coordinated tactile stimulation thereto, and means responsive to the signals for activating the tactile stimulators of each array in predetermined patterns that correspond to signals of the sequence in order to provide a spatially coded tactile presentation of the speech.

The invention further provides a speech simulation apparatus that comprises first and second means for selecting speech consonant and vowel sounds, respectively, third means for selecting mouth forms that produce the consonant and vowel sounds, and means responsive to the first, second and third means for providing signals representative of speech.

BRIEF DESCRIPTION OF THE DRAWINGS

FIG. 1 is a diagrammatic view of a system embodying various aspects of the invention;

FIG. 2 is a diagrammatic view of matrices for presenting spatial patterns in accordance with the invention;

DESCRIPTION OF THE PREFERRED EMBODIMENTS

Figure 3:
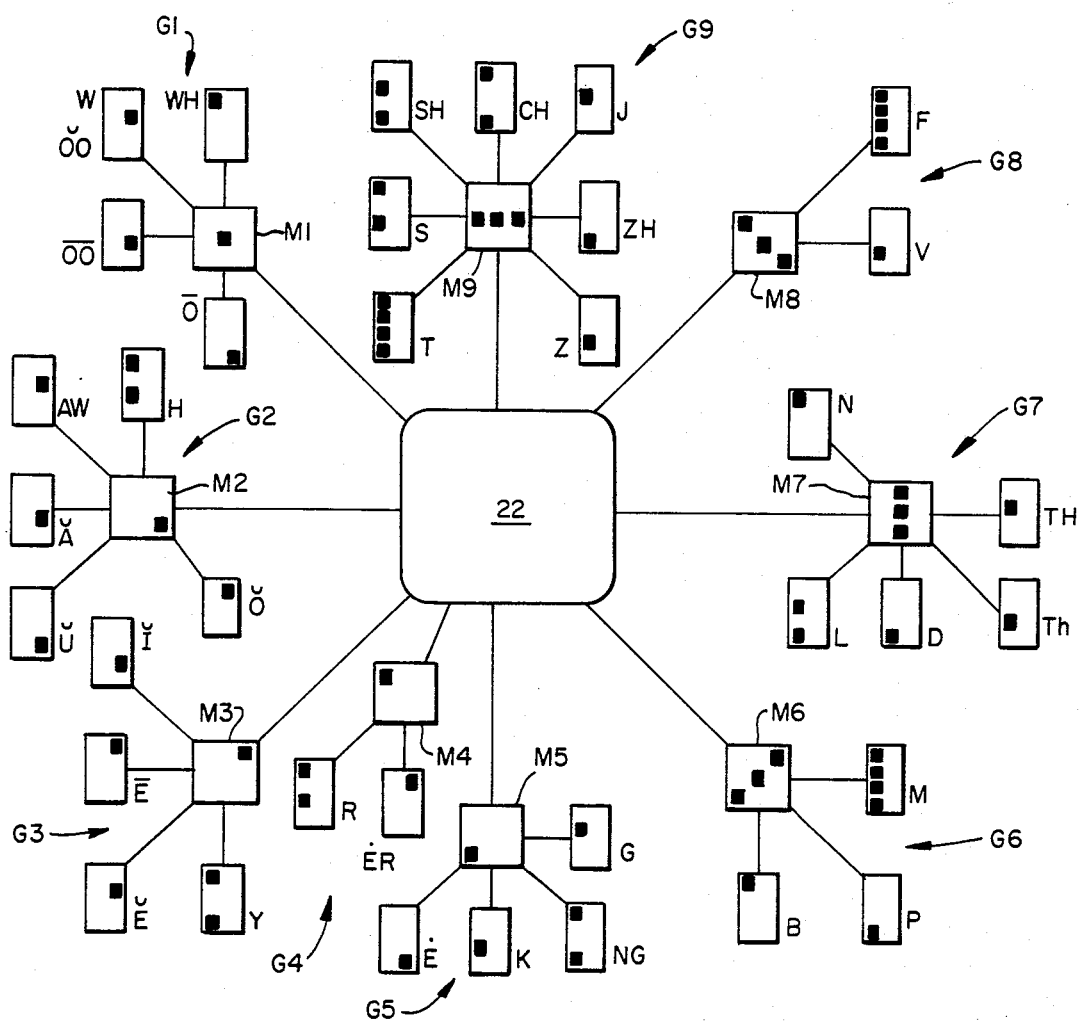
FIG. 3 is a diagrammatic view of the preferred spatial pattern codes for presenting speech phonemes and characteristic mouth forms.

The invention is primarily intended to enable deaf or hearing-impaired (collectively referred to herein as "hearing-handicapped") individuals to communicate and function in a normal hearing environment, and it will be described in that context. However, as will become apparent, the invention has greater utility, and it may be employed advantageously in such areas as speech therapy and foreign language instruction, for example.

As will be described in detail shortly, the invention is multifaceted. In one aspect, the invention provides a speech simulation method and apparatus that afford an accurate and articulate representation of speech, and afford a convenient and reliable presentation of the speech in a format that is easily learned and understood. The presentation may be presented in a tactile form as by an unobtrusive prosthetic device worn on the arm, thereby freeing sight to assume its normal observational role, in a visual form, which is particularly convenient for instructional purposes, or in both tactile and visual forms, thereby affording a multisensory presentation. The speech presentation may be of actual speech, produced in real-time either automatically or manually, and the presentation may be presented contemporaneously with the speech with the innate timing and cadence of the speech. Thus, the invention can substitute for or augment hearing to enable hearing-handicapped individuals to receive and comprehend speech. In addition, simulated speech may be recorded for later reproduction. Significantly, speech is encoded and presented in a manner that is closely related to the actual kinesthetic and physical characteristics of speech. This affords an easily learned and readily understood code, and enables the user readily to verify his or her comprehension of the speech by reproducing the speech and comparing the presentations of the actual and the reproduced speech. This aspect of the invention makes it particularly useful for speech therapy and for learning the correct pronunciation of foreign languages. Having briefly indicated the more salient aspects of the invention, it is now appropriate to describe the invention in detail.

FIG. 1 illustrates a system 20 embodying different aspects of the invention. The figure is intended to represent the functional relationships among different constituent components that the system may include. It does not represent a required combination of components, or even necessarily any particular arrangement or configuration of components. As will become apparent, systems embodying the invention may assume different forms, different configurations, and include different combinations of components.

As shown in FIG. 1, system 20 may include a speech analyzer 22 that receives as an input speech via a switch S1 that enables selection of the output of a general microphone 24, a directional microphone 26, or a jack 28. Jack 28 may be used for speech input to the speech analyzer from another type of microphone or from a sound-producing device such as a radio, television or tape recorder. Switch S1 may also have an unused terminal 30 as for an off position.

Speech analyzer 22 preferably comprises a microcomputer speech analyzer such as disclosed in U.S. Pat. No. 4,284,846 issued Aug. 18, 1981, to John Marley, the disclosure of which is incorporated by reference herein. The Marley speech analyzer analyzes speech in real time (with approximately a 15 msec. delay) by comparing certain computed characteristic parameters of the speech input signals to stored parameters to produce phoneme-representing signals. As will be described in more detail hereinafter, in accordance with the invention each speech phoneme, i.e., a unit sound component of speech representing an utterance, is associated with a characteristic mouth form that produces that phoneme and a sequence of signals representing a sequence of speech phonemes and their characteristic mouth forms is provided. The signals are encoded in a predetermined manner and may be applied to a tactile stimulator 32 and/or to a visual display 34, which present the signals as distinctive spatial multiple point grid patterns corresponding to the phonemes and their characteristic mouth forms. The speech analyzer can also distinguish differences in pitch or speech volume, and may also be programmed to recognize certain environmental sounds such as a siren, a doorbell, a telephone ringer, etc., and to provide signals representing such sounds.

As indicated in FIG. 1, and for reasons which will be described later, the spatial patterns are preferably presented in a dual matrix format using a rectangular matrix for the phonemes and a square matrix for the characteristic mouth forms. Accordingly, tactile stimulator 32 may comprise a rectangular array 36 and a square array 38 of tactile stimulators for providing cutaneous nerve stimulation in accordance with the patterns. Similarly, display 34 may be formed with a rectangular display area 40 and a square display area 42 for displaying the patterns as by illuminating selected portions of each area.

The output signals from speech analyzer 22 may also be applied to a memory 44 having an output adapted to drive tactile stimulator 32 and display 34. The memory enables the simulated speech signals to be recorded for later replay, and enables pre-recorded signals to be reproduced as for instructional purposes.

As shown in FIG. 1, the system may also include a keyboard 50 comprising keyboard sections 52, 54 and 56, respectively, for manually producing phoneme- and mouth form-representing signals for driving tactile stimulator 32, display 34 and memory 44. As will be explained shortly, phonemes are preferably separated into consonant sounds and vowel sounds. Keyboard section 52 comprises a plurality of keys for producing signals representing consonant sounds; keyboard section 54 includes a plurality of keys for producing signals representing vowel sounds; and keyboard section 56 includes a plurality of keys for producing signals representing characteristic mouth forms. The keyboard is particularly useful for instructional purposes since the timing and the sequence of signals produced may be determined by the keyboard operator. It may also be used for producing pre-recorded speech using memory 44, and may be used in combination with the speech analyzer for teaching speech pronunciation as for speech therapy or foreign language instruction.

The tactile stimulator, display and memory may also be driven by an auxiliary input device 60 constructed to produce the phoneme- and mouth form-representing signals. Auxiliary input device 60 may comprise, for example, a receiver for receiving remotely generated signals transmitted thereto as by radio waves. This would be advantageous, for example, in a lecture hall or an auditorium for excluding pickup of extraneous noise or speech signals by microphones 24 and 26. The signals produced by a single speech analyzer positioned near a speaker's rostrum (or receiving an input from a speaker's microphone) or the signals produced by a single keyboard operated by a speech interpreter could be modulated onto an RF carrier that is transmitted throughout the auditorium to a number of different receivers, each of which would demodulate the signal and drive its associated tactile stimulator. Of course, speech output signals from a radio receiver, such as a walkie talkie, could also be input directly to the speech analyzer via jack 28 to accomplish the same effect.

As indicated earlier, the invention contemplates systems having different combinations of the components illustrated in FIG. 1. However, prior to describing such systems, it is first appropriate to consider other significant aspects of the invention relating to the manner in which the encoded spatial presentations of speech are constructed.

Speech comprises sequences of phonemes corresponding to basic unit sound components that are strung together to form words. The particular sequence of phonemes (sounds) and their durations determine the word or words represented. As hereinafter described, spoken English may be represented by 36 different phonemes. Many of these phonemes may also be used for representing sounds in other languages. However, many languages contain sounds that are not present in English, such as, for example, the nasal vowel sounds of French and some of the more guttural sounds of other languages, and additional phonemes may be required for representing these languages. (Speech analyzer 22 has the capability of recognizing more than 36 phonemes, and it may be programmed to provide signals representing phonemes of other languages also.) Some language sounds are multiple sounds and may be represented as a string of two or more phonemes. Phonemes may also be classified as either consonant sounds or vowel sounds, and Cued Speech uses hand forms and hand positions for distinguishing between consonant and vowel sounds, respectively. However, as noted earlier, the hand forms and hand positions convey only approximately 40% of the information required to interpret speech, and the remaining 60% must be derived by lip reading.

In accordance with the invention, speech is presented as spatially encoded patterns. The coding is based upon the kinesthetic characteristics of the mouth during speech and upon the classification of phonemes as either vowel or speech sounds. As such, it relates closely to active speaking and thus differs from other presentation methods such as Braille, Morse code, and fingerspelling, which present the letters of the written language one-by-one, sign languages that convey whole word and concept meanings, and even the phonemic code in the Gazette sections of dictionaries. It has been discovered that the 36 phonemes used to represent spoken English are produced by nine different characteristic mouth formations. The invention associates each phoneme with its characteristic mouth form and encodes the phoneme and mouth form as a distinctive spatial pattern. The spatial patterns are presented in a sensory perceptible form using a dual multiple point grid matrix format, preferably a rectangular matrix for the phonemes and a square matrix for the mouth forms, as will be described hereinafter.

FIG. 2 illustrates a preferred rectangular matrix 70 and a preferred square matrix 72 for presenting the spatial patterns. As shown, the rectangular matrix 70 preferably comprises a two-column by four-row array of "presenters", and the square matrix 72 preferably comprises a three-column by three-row array of presenters. Matrices 70 and 72 may be constituted, for example, as arrays of tactile stimulators (such as shown at 36 and 38 in FIG. 1) or as portions of a display (such as shown at 40 and 42 in FIG. 1) that are adapted to be illuminated. One column 70A of the rectangular matrix comprising four presenters 70A-1 to 70A-4 is used for presenting consonant sounds (phonemes), and the other column 70B comprising presenters 70B-1 to 70B-4 is used for presenting vowel sounds (phonemes). The different consonant and vowel sounds are presented on matrix 70 by activating different combinations of the presenters in each column. In order to make the coding as easy as possible to learn, the presenters of column 70A may be associated with the hand forms of Cued Speech such that each presenter or combination of presenters of column 70A represents a different hand form, and each consonant sound may be presented by activating a pattern of presenters corresponding to the Cued Speech hand form associated with that sound. Similarly, the presenters of column 70B may be associated with the hand positions of Cued Speech, and a vowel sound may be presented by activating presenters corresponding to the Cued Speech hand position associated with that vowel sound. The hand forms and hand positions which the different presenters (or combinations thereof) may represent are indicated schematically in FIG. 2.

In column 70A, for example, each of the four presenters may individually represent the hand forms indicated schematically thereon. To illustrate, presenter 70A-1 may represent a hand form in which all four fingers are extended and the thumb is hidden from view. Presenter 70A-2 may represent a hand form where the thumb and first and second fingers only are extended. Presenter 70A-3 may represent only the first two fingers extended, and presenter 70A-4 may represent only the index finger extended. Other hand forms can be represented by activating different combinations of the presenters, as indicated by the dotted lines in the figure. For example, a hand form (74) in which all four fingers and the thumb are extended may be represented by activating all four presenters of column 70A, as indicated. Other hand forms 75–77 may likewise be represented, as shown.

Similarly, the presenters of column 70B may be associated with the four hand positions indicated schematically thereon. Presenter 70B-1, for example, may correspond to a hand position adjacent to the side of the lips, as indicted by the block dot.

To accommodate additional phonemes of other languages that are not required for English, the rectangular 2-by-4 matrix may be extended to a 2-by-5 matrix as indicated in phantom lines in the figure. Presenter 70B-5, for example, may be used for the French nasal vowels. Also, unused combinations of presenters or double patterns may be employed to represent the additional phonemes.

The nine mouth forms (which will be described in detail shortly) that produce the phonemes are preferably presented on square matrix 72 by using the presenters at the four corners and the center of the matrix individually to represent five of the nine mouth forms (which are indicated schematically thereon). The other four mouth forms may be presented by simultaneously activating the presenters along the two diagonals of the matrix and along horizontal and vertical lines passing through the center presenter 80, as also indicated schematically in the figure. The presenters of square matrix 72 are preferably activated simultaneously with the presenters of rectangular matrix 70, and together the two matrices present the spatial patterns representing phonemes and their characteristic mouth forms.

FIG. 3 illustrates diagrammatically preferred spatial patterns such as may be produced by speech analyzer 22 for representing each of the 36 phonemes and the nine characteristic mouth forms. As shown, there are nine groups G1–G9 of phonemes. Each group corresponds to one of the nine mouth forms, and the phonemes of each group are those that are produced by the corresponding mouth form. The square block of each group corresponds to square matrix 72 and illustrates the coding pattern of the square matrix used to represent the mouth form of that group. The rectangular blocks of each group correspond to the rectangular matrix 70 and illustrate the coding patterns of the rectangular matrix used to represent the different phonemes of the group. The letter or letter pair adjacent to each rectangular block indicates the phonemic sounds represented, and the darkened areas of each block indicate the presenters of the corresponding matrix that are activated. The nine mouth forms are designated M1–M9 in FIG. 3, and they are indicated schematically on the square matrix in FIG. 2.

The phonemes and their characteristic mouth forms, by groups, are as follows:

GROUP G1

Sounds requiring the lips in a little round pucker (mouth form M1), represented by the center presenter 80 of matrix 72 (see FIG. 2), include "$\overline{O}$" as in "no"; "$\overline{OO}$" as in "book"; "OO" as in "moon" and "W" as in "was" which is the same sound with a shorter duration; and the more blown "WH" as in "when". (The phoneme "WH" is a consonant sound, as shown by being coded in the left column (70A) of the rectangular matrix by presenter 70A-1, whereas the remaining phonemes of the group are vowel sounds and are coded in the right column of the matrix by presenters 70B-4, 70B-3 and 70B-2, respectively.)

GROUP G2

Sounds made with an open mouth and a lowered chin (M2), encoded by presenter 81 of matrix 72, include "H" as in "help"; "AW" as "o" in "cost"; "A" as in "patent"; "U" as in "up"; and "O" as in "dot" and "cot". ("H" is the only consonant sound of the group and is encoded by a combination of two presenters.)

GROUP G3

Sounds made with a near smile and a tense mouth (M3), encoded by presenter 82 of matrix 72, include "I" as in "it"; "$\overline{E}$" as in "cheese", "E" as in "end"; and "Y" as in "yes".

GROUP G4

Sounds made with a tense open mouth and nasal resonance (M4), encoded by presenter 83 of matrix 72, include "R" as in "run"; and "ER" as in "her".

GROUP G5

Throatal sounds requiring open relaxed lips (M5), encoded by presenter 84 of matrix 72, include "K" as in "kick"; "G" as in "giggle"; a nearly unheard throatal resonant "E" as in "the"; and "NG" as in "ping pong".

GROUP G6

Sounds requiring tightly closed lips (M6), encoded by presenters 80, 82 and 84, include "B" as in "baby"; "P" as in "pep"; and "M" as in "mama".

GROUP G7

Sound requiring interaction of the tongue and top teeth (M7), encoded by presenters 80, 85 and 86, include "L" as in "little"; "N" as in "none"; "TH" as in "three"; "Th" as in "them"; and "D" as in "dad".

GROUP G8

Sounds requiring interaction of the lower lip and upper teeth (M8), encoded by presenters 80, 81 and 83, include "F" as in "fluffy"; and "V" as in "vivid".

GROUP G9

Sounds requiring interaction of the upper and lower teeth (M9), encoded by presenters 80, 87 and 88, include "Z" as in "zip"; "ZH" as in "measure"; "S" as in "sister"; "SH" as in "shine"; "CH" as in "cheap"; "T" as in "street"; and "J" as in "judge".

Some sounds are multiple sounds that can be coded as a "gliding" sequence of two or more phonemes. These include "$\overline{A}$ as in "pay" which, pronounced one way, can be coded as M3-I to M3-$\overline{E}$ or, pronounced another way, as M5-E to M3-$\overline{E}$; "$\overline{I}$" as in "idea" can be coded as M2-A to M3-$\overline{E}$ or a bit more British as M2-AW to M3-$\overline{E}$; "X" as in "box" can be coded as M5-K to M9-S; and "X" as in "X-ray" can be coded either as M3-$\overline{E}$ to M5-K to M9-S or as M5-E to M5-K to M9-S. Also, "E" is used with the following sounds at word endings as a sound explosion for sound termination: "B" as in "mob"; "CH" as in "beach"; "D" as in "had"; "G" as in "dog"; "J" as in "badge"; "K" as in "stock"; "P" as in "hop"; and "T" as in "pat". For example, "mob" can be represented as the phoneme sequence "M-O-B-E". It is also possible in some cases to use a combination of M5-E and M4-R for "ER" rather than its own sound, especially for the "ER" ending as in "doer".

It is, of course, possible to employ a different coding scheme from that described above. Moreover, as previously indicated, the rectangular matrix can be extended to accommodate the phonemes of other languages, and any additional mouth forms required may be presented as different coding patterns on the square matrix. In addition, environmental sounds such as a siren, a doorbell, a phone ringing, or a dog barking may be presented on the square matrix, as by activating combinations of presenters not passing through the center presenter 80, or as by rapidly alternating between different combinations of presenters. It is particularly desirable to present "emergency" sounds, e.g., a siren, to a hearing-handicapped individual to warn of danger, and this may be accomplished with the invention. If desired, the spatial patterns employed may be custom designed for different languages, or in accordance with a user's preference, and may be readily adapted for bilingual or multilingual use.

As noted earlier, it is significant that the encoded spatial patterns represent not only phonemes but also their characteristic mouth forms, and as such bear a close relationship to actual speech. This is advantageous since it allows a user to reproduce readily the "perceived" phonemes so that he or she can verify the accuracy of his or her perception. In addition, the close relationship to actual speech facilitates learning to use the invention. Also, as is evident from the foregoing, the invention presents in a non-auditory form the same type of information that is presented to the ear. Therefore, the hearing-handicapped individual can receive not only the speaker's meaning, but also the speaker's choice of words and pronunciations.

Figure 4:
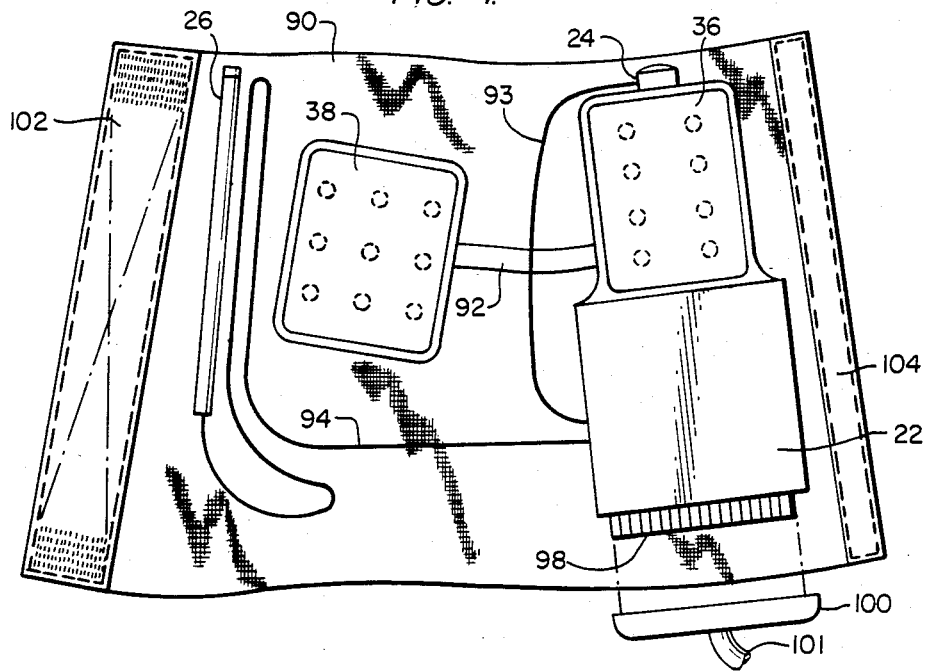
FIG. 4 is a perspective view of a preferred prosthesis apparatus in accordance with the invention for presenting tactile stimulation.
Figure 5A:
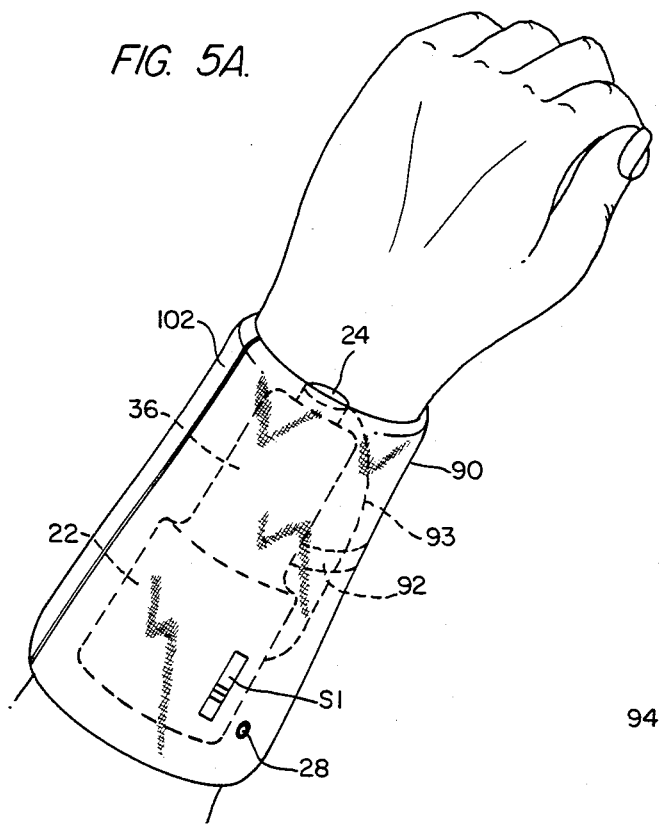
FIGS. 5A and 5B are perspective views illustrating the apparatus of FIG. 4 in use.
Figure 5B:
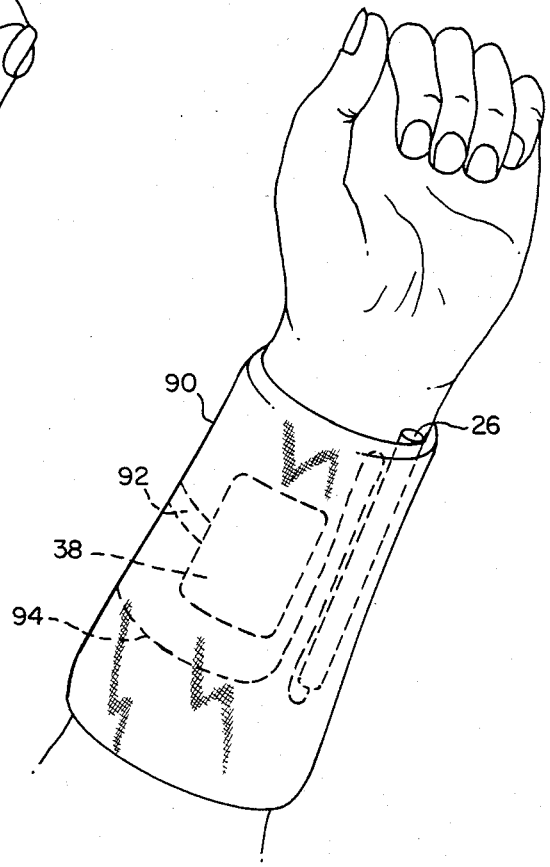

FIGS. 4, 5A and 5B illustrate a preferred arrangement of the invention for affording tactile reception of real-time speech. Tactile stimulators 36 and 38 and speech analyzer 22 may be built into the lining of an armband 90 adapted to be worn on the forearm of the user, as illustrated in FIGS. 5A and 5B. Speech analyzer 22 and tactile stimulator 36 are preferably formed as an integral unit, as shown, and are preferably positioned in the armband so that they can be located on the upper side of the forearm. Tactile stimulator 38 may be connected to the speech analyzer and tactile stimulator 36 by a cable 92, and is preferably positioned in the armband so that it can be located in opposing relationship to tactile stimulator 36 on the underside of the forearm. This affords coordinated tactile stimulation of opposing sides of the forearm by the two tactile stimulators.

Figure 15A:
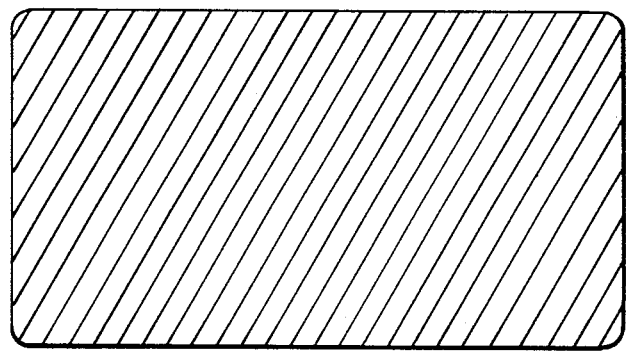
FIGS. 15A and 15B are diagrammatic views illustrating areas of sound coverage in a room, for example, such as may be afforded by different microphones.
Figure 15B:
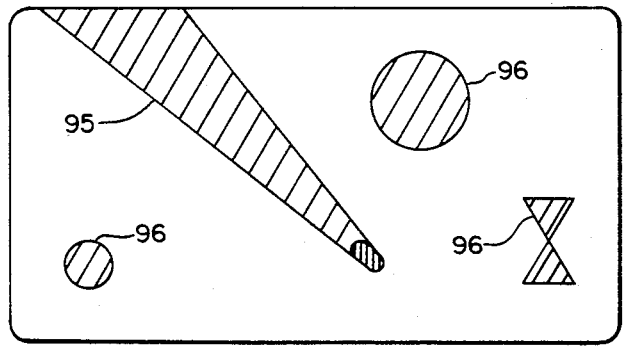

General microphone 24 and directional microphone 26 may be positioned within the armband as shown and exposed for sound reception. The microphones may be connected by wires 93 and 94, respectively, to switch S1 (see FIG. 5A) which may be a slide switch exposed on the armband for easy operation. Jack 28 may also be exposed adjacent to the switch to enable input from other microphones or direct input from other speed sources. Wire 94 to directional microphone 26 is preferably long enough to enable the directional microphone to be removed from the armband and held extended, for example, or to enable it to be placed adjacent to the speaker of a telephone handset. FIGS. 15A and 15B illustrate the different areas of sound coverage in a room, for example, such as may be afforded by different types of microphones. General microphone 24 affords complete room coverage as shown in FIG. 15A, whereas directional microphone 26 allows a particular sector 95 (FIG. 15B) to be covered. Jack 28 permits other types of microphones to be used so as to provide specialized coverage of other types of areas 96 as shown in FIG. 15B. A multipin connector 98, adapted to receive a mating connector 100 of a multi-conductor cable 101, may also be included to enable direct input to the tactile stimulators, as from the keyboard. Preferably, the speech analyzer, the keyboard and the memory incorporate separate sets of drivers for driving the tactile stimulators.

Armband 90 may be provided with suitable fasteners 102 and 104, such as Velcro ™ fasteners, which extend along the sides of the armband to enable it to be securely fastened to the forearm. The armband may also include suitable padding, and the various components such as the tactile stimulators may be suitably contoured (as hereinafter described) so as to avoid irritation to the user's forearm if it rests on the components. Preferably, the armband is worn on the forearm of the non-dominant hand, thereby freeing the dominant hand for such chores as writing, etc., and the tactile stimulator matrices are preferably oriented so that their vertical (in FIG. 2) axes are parallel to the longitudinal axis of the arm so as to match the user's kinesthetic sense. Also, since in use the rectangular tactile stimulator 36 is upside down from the orientation illustrated in FIG. 4 (see FIG. 5A), it is formed such that the left column of tactile stimulators in FIG. 4 corresponds to the vowel side of the matrix and the right column corresponds to the consonant side. Thus, when the armband is in use and the matrix is positioned on the top of the forearm (see FIG. 5A), the vowel side of the matrix will be positioned adjacent to the thumb side of the forearm, and the columns will have the same relative positions as in FIG. 2. A battery (not illustrated) may also be built into the armband for providing electrical power to the speech analyzer and to the tactile stimulators.

Figure 9A:
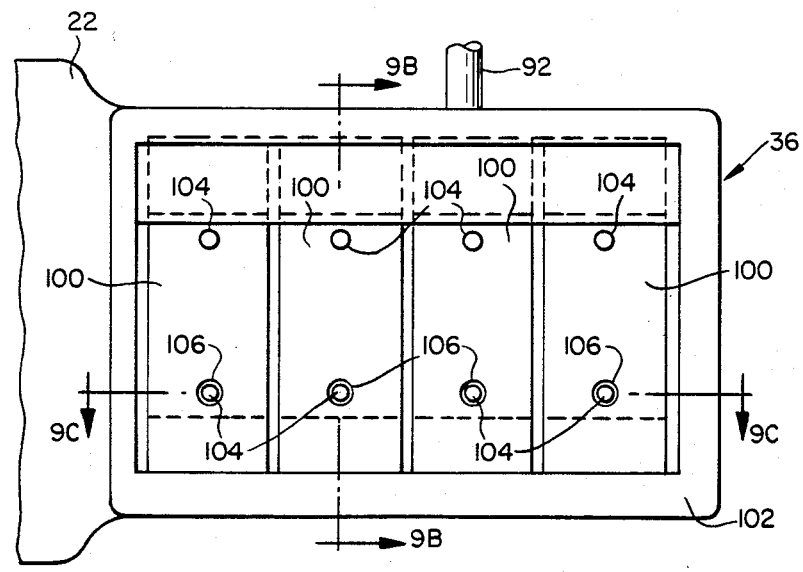
FIGS. 9A–9C are, respectively, a plan view, a transverse sectional view taken along line 9B—9B of FIG. 9A, and a longitudinal sectional view taken along line 9C—9C of FIG. 9A of a first tactile stimulator matrix of the apparatus of FIG. 4.
Figure 9B:
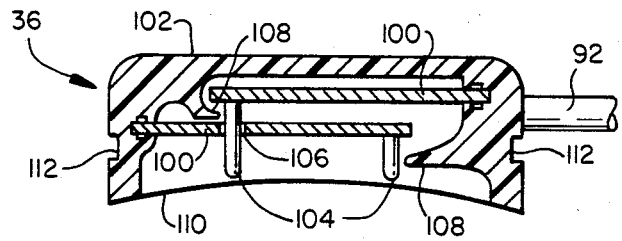
Figure 9C:
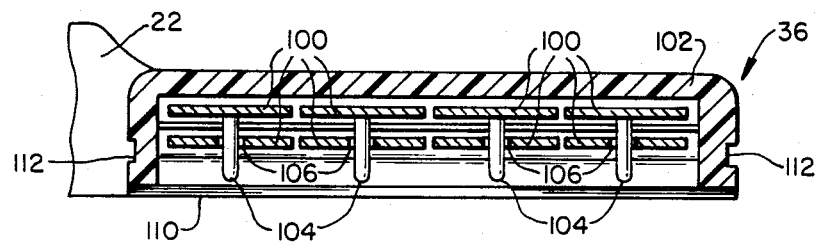

FIGS. 9A–C and 10A–C illustrate a preferred construction of tactile stimulator matrices 36 and 38, respectively. Each tactile stimulator, i.e., presenter, of a matrix preferably comprises a rectangular piezoelectric crystal strip bender such as is used with devices (i.e., an Opticon ™) for presenting Braille and such as is available commercially under the name "Gulton Bender". As shown in FIGS. 9A–C, rectangular matrix 36 may comprise eight such benders 100 disposed within a housing 102, as of molded plastic, and arranged in two rows of four benders in side-by-side relationship. As best illustrated in FIGS. 9B and 9C, the two rows of benders may be cantilevered from opposite sides of the housing with one row above the other. Each bender has a depending projection 104 adjacent to its free end, and the benders in the lower row may have holes 106 therethrough to pass the projections of the benders of the upper row.

When a voltage (of the correct polarity) is applied to opposite sides of a bender, its free end flexes downwardly causing projection 104 to contact the skin, thereby providing cutaneous nerve stimulation. The benders may be driven by either AC or DC voltages. When driven by AC voltages, they vibrate at the frequency of the AC voltage. The benders have a resonant frequency that is related to their dimensions and which, in part, determines the force with which the bender projections impact the skin. Driving the benders at different frequencies enables accented or emphasized parts of words, or differences in pitch, to be indicated. Electrical wires (not shown) from the speech analyzer and from connector 100 may be embedded within the material forming the housing and may connect to each bender at its fixed end. As shown in FIG. 9B, the housing may be formed with inwardly projecting stops 108 adjacent to the free ends of the benders to limit the amount of their downward travel, and the lengths of the projections 104 are selected to enable the projections to contact the skin when the benders flex. Base 110 of the housing may be contoured (FIG. 9B) so as to match the contour of the user's forearm, and the housing may be formed with a peripheral notch 112 around its exterior to enable a dust cover as of textured silk or some other suitable material to be held over the open base of the housing.

Figure 10A:
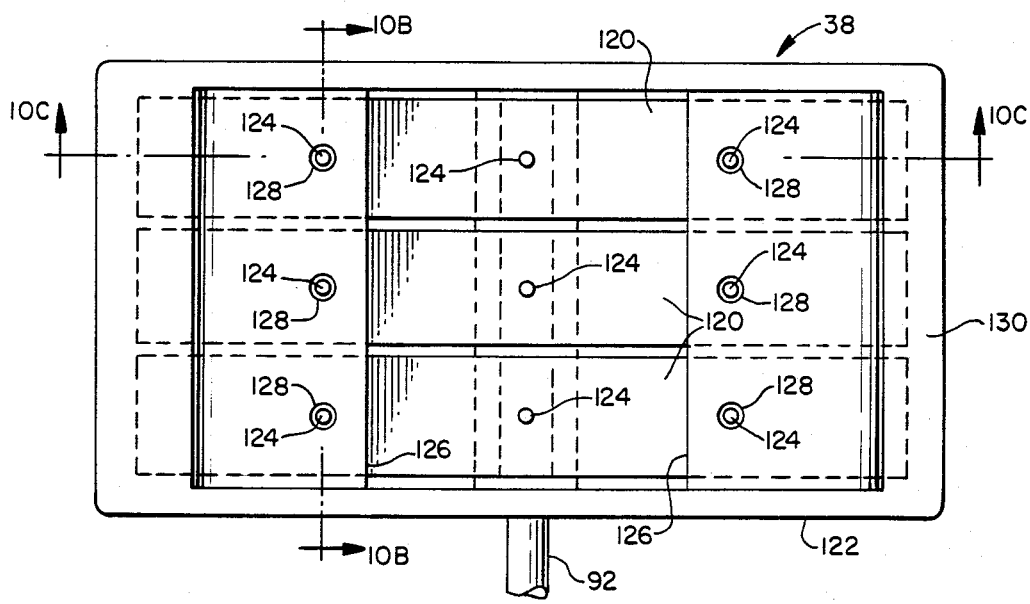
FIGS. 10A–10C are views similar to FIGS. 9A–9C, respectively, of a second tactile stimulator matrix of the apparatus of FIG. 4.
Figure 10B:
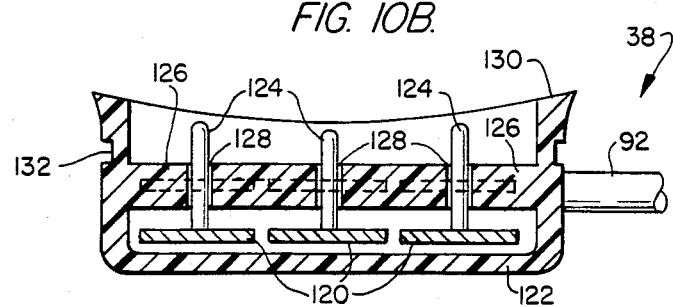
Figure 10C:
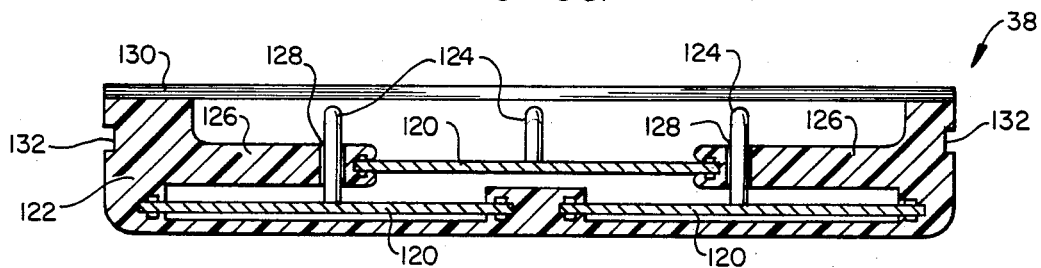

The square tactile stimulator matrix 38 may have a somewhat similar construction. However, as shown in FIGS. 10A–C, the square matrix employs nine piezoelectric benders 120 disposed within a housing 122, which may also be of molded plastic, such that both ends of each bender are fixed within the housing, as shown in FIG. 10C. The stimulator projections 124 of each bender are located at the center of the bender strip, rather than at an end as with benders 100, and when voltages are applied to benders 120, their middle portions flex causing projections 124 to contact the skin. Three benders are arranged side-by-side in a transverse direction (see FIG. 10B) and there are two rows of three benders in a longitudinal direction as shown in FIG. 10C to provide the 3-by-3 matrix. As shown in FIG. 10C, the middle benders may be supported on inward projections 126 of the housing. The projections 126 may have holes 128 for passing the stimulator projections 124 as best illustrated in FIGS. 10B and C. Since the benders 120 are fixed at both ends, they do not flex as much as benders 100. Therefore, stops are not required to limit their downward travel. The base 130 of the housing may also be contoured in a transverse direction (see FIG. 10B) to match the contour of the forearm, and the housing may have a peripheral notch 132 about its exterior for receiving a dust cover in the same manner as matrix 36 for covering the open base 130.

Other types of tactile stimulators and other armband configurations may, of course, by employed. For example, only the tactile stimulator matrices may be built into the armband and the speech analyzer may be configured as a separate unit sized to fit in a shirt or coat pocket and adapted to be connected to the tactile stimulator matrices by a cable. The configuration of FIGS. 4 and 5A–5B, however, has the advantage of being entirely self-contained within the armband. If desired, the armband may also be formed with arrays of light-emitting diodes (LED'S) positioned so as to be located on the upper side of the forearm to provide a visual display of the spatial patterns simultaneously with tactile stimulation.

Although tactile stimulation of other parts of the body may be employed, it is preferable to use the forearm and to position the tactile stimulator matrices in opposing relationship on opposite sides of the forearm as described. This enables a coordinated stimulation of opposing sides of the forearm. By simultaneously providing tactile stimulation to opposing sides of the forearm, it has been found that the different stimulation patterns can be distinguished more readily than if the stimulation were otherwise applied. It also permits the armband to be more compact while affording sufficient separation between the individual stimulators to enable stimulation by adjacent stimulators to be easily discerned. Moreover, stimulating opposing sides of the forearm has been found to be more comfortable to the user in that it does not produce the same degree of irritation or annoyance that stimulating only one side would produce.

Figure 6:
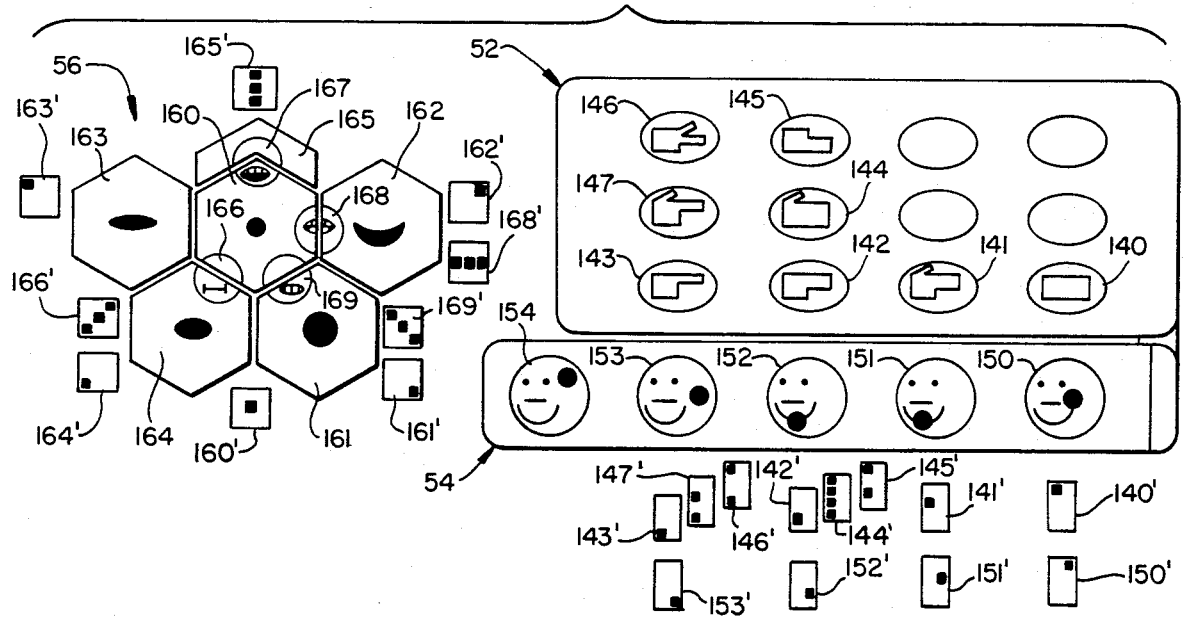
FIG. 6 is a diagrammatic view of a preferred keyboard apparatus in accordance with the invention.
Figure 7:
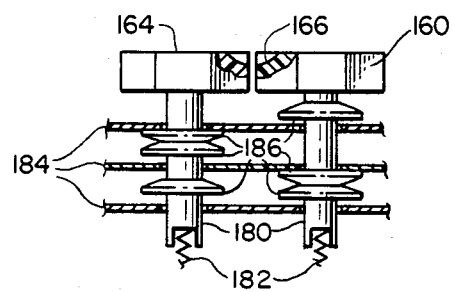
FIG. 7 is a sectional view, partially broken away, of a portion of the keyboard apparatus of FIG. 6.
Figure 8:
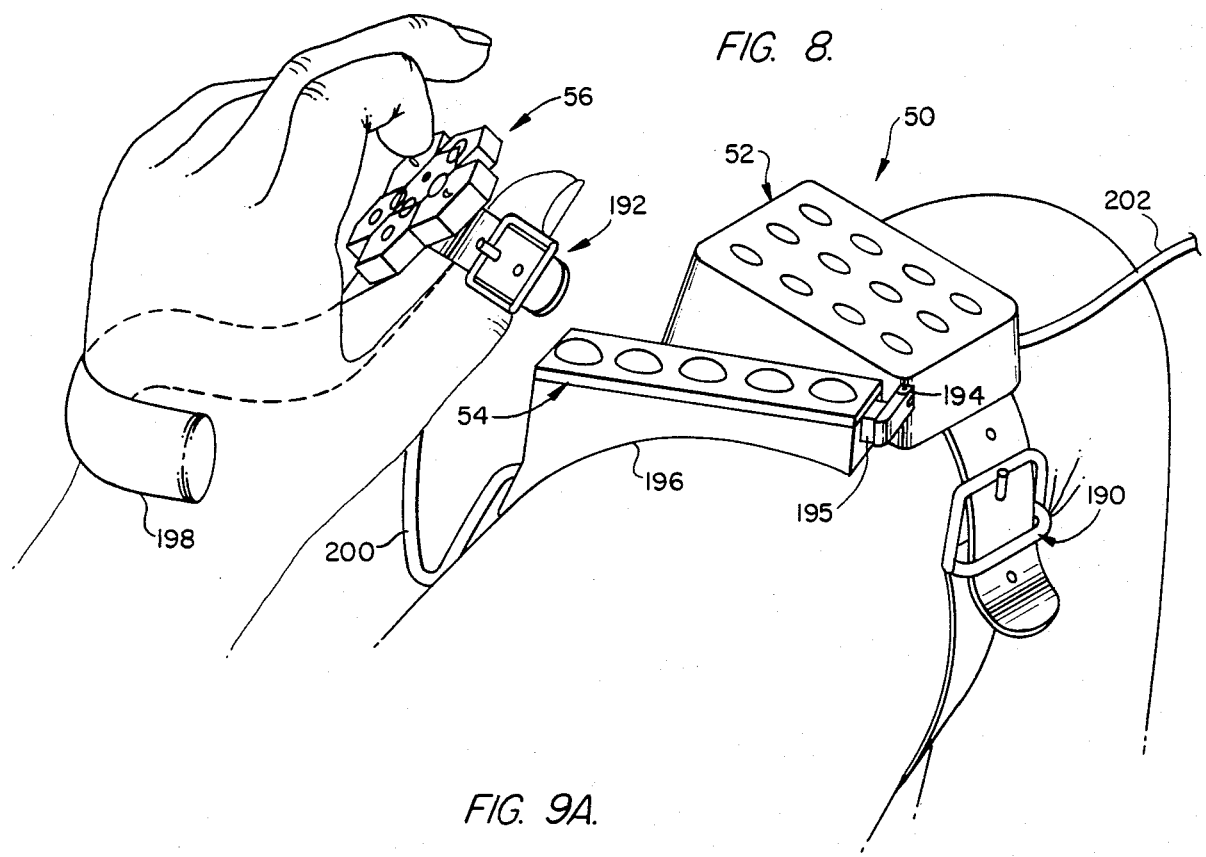
FIG. 8 is a perspective view illustrating the keyboard apparatus of FIG. 6 in use.

FIGS. 6–8 illustrate in more detail a preferred arrangement of keyboard 50. As noted earlier, the keyboard may comprise three sections 52, 54 and 56, each section comprising a plurality of keys for producing signals representing, respectively, consonant sounds, vowel sounds and characteristic mouth forms for driving corresponding portions of matrices 70 and 72 (FIG. 2). As shown in FIG. 6, the keys may have thereon graphic legends which schematically indicate the hand form, hand position and mouth form signals that they produce. Also shown in FIG. 6 are the spatial patterns produced by the keys.

Keyboard section 52 may comprise, as shown, twelve keys, eight of which are used for producing signals corresponding to the eight hand forms of FIG. 2. The bottom row of keys 140 to 143 activates presenters 70A-1 to 70A-4, respectively, of rectangular matrix column 70A, as indicated by the legends on the keys and as indicated by the spatial patterns 140' to 143' in FIG. 6. Similarly, keys 144 to 147 activate different combinations of the presenters of column 70A as indicated by the legends on the keys and the correspondingly numbered and primed spatial patterns of FIG. 6. The four blank keys of keyboard section 52 are not required for the particular coding patterns disclosed, but may be included to allow the keyboard to be adapted easily for multi-lingual speech stimulation, as by wiring the keys to produce desired patterns.

Keyboard section 54 may include five keys 150–154 corresponding, respectively, to presenters 70B-1 to 70B-5 or matrix column 70B. The spatial pattern produced by each key, correspondingly numbered and primed, is shown in FIG. 6. Key 154 is included to accommodate expansion of the rectangular matrix to a 2-by-5 matrix.

Keyboard section 56 may comprise five hexagonal-shaped keys 160–164 and one chevron-shaped key 165, as shown. Keys 160–164 activate presenters 80–84, respectively, of square matrix 72 to produce signals corresponding to mouth forms M1–M5, respectively. The spatial pattern on the square matrix produced by each key, correspondingly numbered and primed, is shown in FIG. 6. Signals corresponding to mouth forms M6 to M9 are produced by simultaneously depressing two different keys. To facilitate this, shallow finger depressions or indentations 166–169 may be formed in the adjacent portions of the surfaces of keys 160–162, 164 and 165, as shown. Simultaneously depressing the center key 160 and the lower left key 164 at finger depression 166 activates presenters 80, 82 and 84 of the square matrix and produces a signal corresponding to mouth form M6, as indicated. Similarly, simultaneously depressing the center key and key 165, 161, or 162 activates appropriate combinations of the presenters to produce signals corresponding to mouth forms M7–M9, respectively.

Keyboard section 56 may also be used for activating patterns on the square matrix to represent environmental sounds. For example, depressing chevron-shaped key 165 alone, or depressing different combinations of peripheral keys 161–164 may activate three presenters of the square matrix in a line not passing through the center presenter (80), or may cause two patterns to alternate back and forth.

FIG. 7 is a sectional view, partially broken away, of a portion of keyboard section 56 showing one possible construction, the figure illustrating center key 160 and peripheral key 164. As shown, each key may have a shaft 180 depending from its underside that engages springs 182 that bias the keys upwardly to their non-depressed positions. The shafts may pass through three printed circuit boards 184 and may have disposed thereon metallic contacts 186 adapted to engage conductor patterns (not illustrated) on the printed circuit boards so as to complete electrical circuits. As shown, the upper (in the figure) contact of switch 164 and the middle contact of switch 160 engage the upper and the middle printed circuit boards, respectively, when the switches are in their non-depressed positions. When the switches are depressed, these contacts move out of engagement with the conductors on their respective printed circuit boards and break the electrical circuits. The remaining two contacts of each switch are adapted to engage certain ones of the printed circuit boards to complete electrical circuits when the switches are depressed. The conductor patterns on the printed circuit boards may be connected together and to the presenters of the square matrix so that when either switch is depressed (alone) its corresponding presenter is activated, and such that when both switches are depressed simultaneously the appropriate combination of presenters is activated. Alternatively, keyboard section 56 may be constructed so that each switch has a single switch contact that closes an electrical circuit, and the electrical circuits may be configured in a logical switching arrangement (using digital logic circuits, for example) to provide the desired output signals.

FIG. 8 illustrates a particularly convenient arrangement for keyboard 50. As shown, keyboard sections 52 and 54 may be configured to be secured to a leg (for example, the right leg) of the user as by a strap and buckle arrangement 190, and keyboard section 56 may be formed to be secured to the thumb of the left hand of the operator, as by another strap and buckle arrangement 192, as shown. This arrangement allows keyboard section 56 to be operated with the fingers of the left hand, while simultaneously allowing keyboard sections 52 and 54 to be operated with the fingers and the thumb, respectively, of the right hand. Keyboard section 54 may be hinged as shown at 194 to keyboard section 52 and movably supported on a member 195 attached to the hinge to enable the keyboard sections to be positioned at an angle and location convenient for the operator. The keyboard sections may also have a contoured base, as shown at 196 for keyboard section 54, to conform to the user's leg. Keyboard section 56 may be provided with a contoured extension 198, as of plastic or rubber, adapted to fit in the palm of the user's hand and to extend around the wrist to the back of the hand to prevent keyboard section 56 from rotating about the user's thumb. A cable 200 may be used for electrical connection between keyboard section 56 and keyboard sections 52 and 54 as shown, and another cable 202 may be used for the output signals from the three keyboard sections. Cable 202 may correspond to cable 101 (FIG. 4), for example.

As noted earlier, the keyboard may provide output signals to the tactile stimulator, to the display or to the memory by direct electrical connection thereto, or the signals may be modulated onto radio waves and transmitted to an auxiliary input device connected to these components, or to a radio receiver connected to jack 28 of the speech analyzer. This arrangement, as previously indicated, is particularly advantageous for use in a lecture hall or the like where one speech interpreter operating a keyboard can serve a number of different individuals.

Memory 44 and display 34 of system 20 (FIG. 1) may assume a number of different forms. For example, the memory might comprise a tape recorder for recording the signals representing the spatial patterns on magnetic tape and may be configured to provide an output to drive tactile stimultor 32 and display 34. By using a dual track tape recorder, an audio output of the speech may also be provided simultaneously with the spatial patterns, which would be particularly convenient for speech therapy or for foreign language instruction. Display 34 may assume different forms such as, for example, a light panel configured to present the spatial patterns as illuminated areas. FIGS. 11A-B, 12A-B and 13A-B illustrate an apparatus that combines both a memory and a display.

Figure 11A:
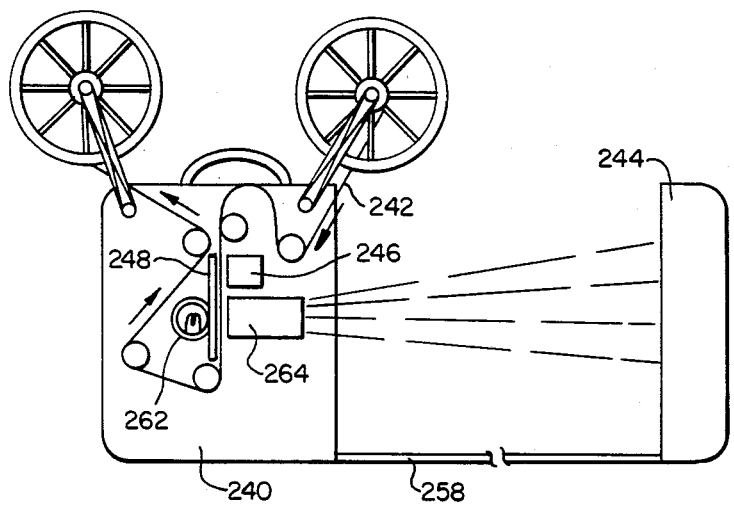
FIGS. 11A and 11B are, respectively, an elevation view and a perspective view of a memory and display apparatus in accordance with the invention.
Figure 11B:
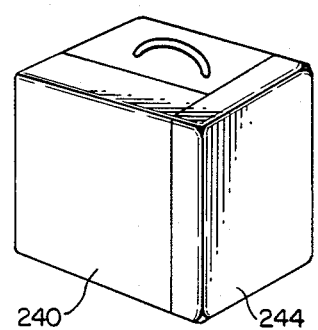
Figure 13A:
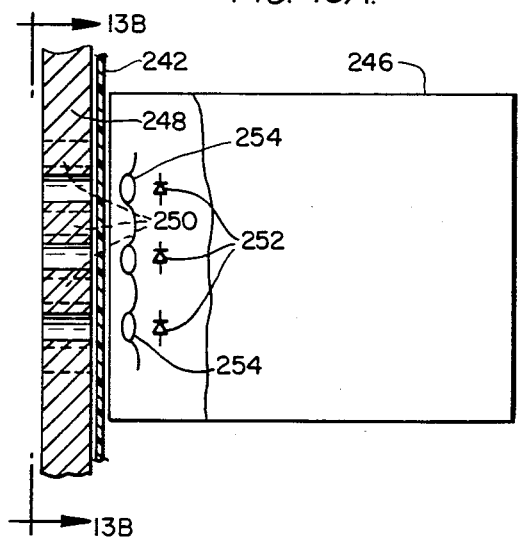
FIGS. 13A and 13B are, respectively, a partial sectional view and an elevation view of portions of a punch arrangement that may be employed with the apparatus of FIGS. 11A–11B, FIG. 13B being a view along line 13B—13B of FIG. 13A.
Figure 13B:
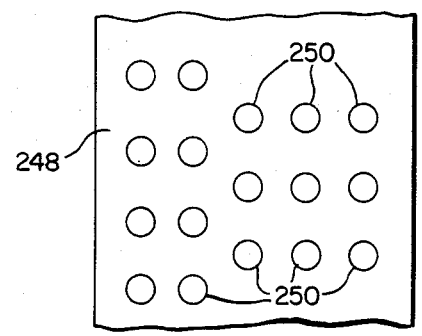

As shown in FIG. 11A, a memory 44 may comprise a modified 16 mm projector 240 configured to preserve the spatial patterns on punched tape or film 242 and to display the spatial patterns by projecting them onto a display panel 244. (FIG. 11B shows the projector and display together for easy transportability.) To punch the film, projector 240 may include a punch 246, one form of which is illustrated in FIG. 13A, adapted to be driven by either the speech analyzer or the keyboard and to be operated at the 24 frame per second rate of the projector so as to be synchronous with the film advance mechanism. Punch 246, which is located ahead of the shutter, may be a mechanical punch comprising a plurality of hole punches arranged in the 2-by-4 (or 2-by-5) and 3-by-3 matrix configurations that impact upon a backing plate 248 (shown in FIG. 13B) having a corresponding arrangement of holes 250 therein. The punch may also be a laser diode punch (see FIG. 13A) comprising arrays of laser diodes 252 and associated focusing lenses 254 arranged in accordance with the matrix configurations. The projector may also include an exhaust or collection system (not illustrated) behind backing plate 248 to collect the punched debris from the film, and may include a guide 258 for indicating the correct distance of display 244 form the projector for proper positioning of the projected patterns on the display.

Figure 14:
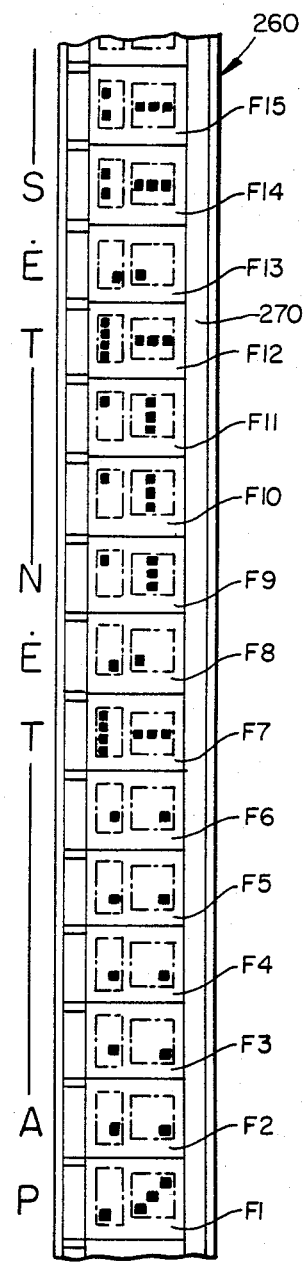
FIG. 14 is a diagrammatic view of a portion of film that may be produced by and used with the apparatus of FIGS. 11A–11B.

FIG. 14 illustrates a strip 260 of punched film such as may be produced by the invention, the film being illustrated as it would appear if viewed from the rear of projection lamp 262 through the backing plate and projection lens 264 of projector 240 (see FIG. 11A). (For ease of illustration, the spatial patterns on the film are illustrated as blackened areas, whereas on the actual film the background would preferably be black and the spatial patterns would appear as clear areas.) The figure illustrates the sequence of spatial patterns corresponding to the constituent phonemes of one pronunciation of the word "patents", the film being read from the bottom to the top of the figure corresponding to the direction in which it is advanced through projector 240. The phoneme spatial patterns appear on successive frames F1-F15, and the phoneme represented by each pattern is indicated on the left side of the figure.

The film presents not only the phonemes in their proper sequence, but also indicates their timing, i.e., duration. As shown, frame F1 contains the spatial pattern for the phoneme "P", which (for this example) has a duration of only one frame, whereas frames F2-F6 contain the spatial pattern for the phoneme "A", indicating that its duration is four times that of phoneme "P". Frames F7 and F8 contain the spatial patterns for the phonemes "T" and "E", respectively, each having a duration of only one frame. Frames F9-F11 contain the spatial pattern for the phoneme "N", which has a duration of three frames; frames F12 and F13 contain the spatial patterns for the phonemes "T" and "E", respectively, and frames F14 and F15 contain the spatial pattern for the phoneme "S".

The phoneme sequence illustrated in FIG. 14 corresponds to the pronunciation "pá-ten-tes". "Patents" may also be pronounced as "pá-ten-z", in which case the spatial patterns in frames F12–F15 (and perhaps additional frames depending upon the duration of the ending) would be the spatial pattern representing the phoneme "Z". This illustrates a significant aspect of the invention. Namely, the invention presents the same information that would be presented to the ear, i.e., the actual phonemic content of speech, which may vary depending upon pronunciation, as well as the timing and cadence of the actual speech.

The punched film may be projected and viewed as it is produced with approximately a two-frame (1/12 second) delay. As the film is punched, the speech may also be recorded on a sound track 270 of the film, and may be reproduced simultaneously with the spatial patterns so as to afford a multi-sensory presentation. The punched film also has the advantage that it can be read both visually (without projecting it) and tactilely (much like Braille) by running a finger across the film to sense the punched patterns. Thus, deaf-blind individuals can easily identify a particular film or portion thereof that they wish to review. Furthermore, projector 240, which normally runs at the standard 24 frames per second rate, can be slowed down or advanced in a stop-frame mode, as for instruction or demonstration purposes, without distorting either the visual presentation or a tactile presentation derived therefrom.

Figure 12A:
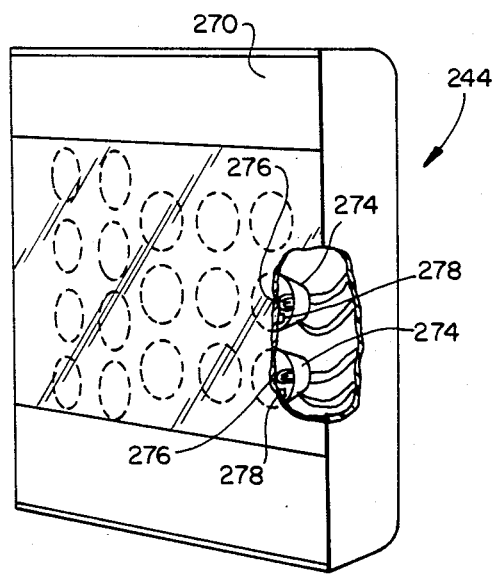
FIGS. 12A and 12B are, respectively, a perspective view, partially broken away, and a partial sectional view of a display apparatus that may be employed with the apparatus of FIGS. 11A–11B.
Figure 12B:
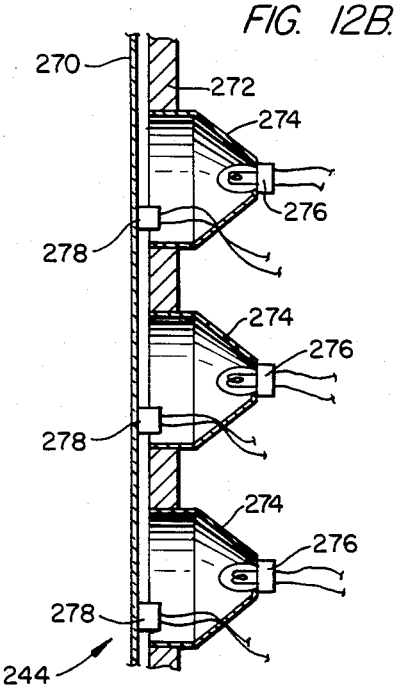

FIGS. 12A and 12B illustrate in more detail a preferred form of display 244 which may be built into the end cover of the projector 240 for easy transportation, as illustrated in FIG. 11B. Preferably, display 244 comprises a ground glass projection surface 270 onto which the spatial patterns of the punched film may be projected, as shown in FIG. 11A. A backing plate 272 having hole patterns corresponding to the rectangular and square matrices may be positioned behind the ground glass projection surface, and reflectors 272 having light sources 276 therein may be located within the holes of the backing plate, as illustrated in FIG. 12B. Preferably, the backing plate and the reflectors are selected so as to afford a substantially constant surface reflectivity to the ground glass projection surface so that when viewed from the front the surface appears uniform. Photocells or other light responsive devices 278 may be positioned at the rear surface of the projection surface within each reflector and slightly offset from the center line of the reflector, as shown in FIG. 12B.

Display 244 may be used in a number of different ways. The display may be used only as a projection screen for viewing the spatial patterns projected thereon by projector 240. Display 244 may also be used without projector 240 as a rear projection type display for displaying the spatial patterns by driving lamps 276 directly from the speech analyzer, the keyboard, or an auxiliary device, e.g., a tape recorder. Photocells 278 respond to the patterns of light projected onto the ground glass surface by the projector or produced by lamps 276, and produce outputs that may be used for driving the tactile stimulators to provide tactile stimulation simultaneously with the visual display. Display 244 can also be used conveniently for speech therapy or instructional purposes since it enables a student to compare his or her speech attempts to "model" speech, as by simultaneously presenting the model speech and the student's speech using different colors.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A method of presenting speech information comprising separating speech into a sequence of phonemes representative of the speech; transforming each phoneme into first and second grid patterns of points, the first pattern being a code which identifies the phoneme sound and the second pattern being another code which identifies a mouth form that produces the phoneme sound; and presenting the first and second patterns by activating presenters arranged in a multiple point grid matrix in accordance with said patterns of points.

2. The method of claim 1, wherein said separating comprises identifying successive phonemes and their durations, and wherein said presenting comprises successively presenting the first and second patterns with the same durations as the phonemes to which they correspond.

3. The method of claim 2, wherein said presenting comprises presenting the patterns substantially contemporaneously with the speech.

4. The method of claim 1, wherein said presenting comprises presenting the first patterns on a first multiple point grid matrix array of presenters and presenting the second patterns on a second multiple point grid matrix array of presenters.

5. The method of claim 4, wherein the presenters of the first array comprise first and second groups of presenters, the first group being employed for representing consonant sounds and the second group being employed for representing vowel sounds.

6. A speech presentation apparatus comprising first keyboard means for selecting speech phonemes corresponding to consonant sounds, second keyboard means for selecting speech phonemes corresponding to vowel sounds, third keyboard means for selecting mouth forms that actually produce said consonant and said vowel sounds, each keyboard means having a plurality of keys for enabling the selections, and means responsive to the first, second and third keyboard means for providing signals representative of said phonemes and mouth forms.

7. The method of claim 1, wherein said transforming comprises associating each phoneme sound with one of a preselected group of mouth forms.

8. The method of claim 1, wherein said presenting comprises presenting the patterns as tactile stimuli.

9. The method of claim 1, wherein said presenting comprises presenting the patterns as visual stimuli.

10. The method of claim 1, wherein said presenting comprises presenting the patterns simultaneously as tactile and visual stimuli.

11. The method of claim 1, wherein said presenting comprises presenting the first and second patterns at different locations.

12. A method of presenting speech information comprising producing a sequence of signals representative of speech phonemes; transforming the signals into a sequence of first and second grid patterns of points, the first pattern being a code which identifies the phoneme sound and the second pattern being another code which identifies a mouth form that produces the phoneme sound; and presenting the first and second patterns by activating presenters arranged in a multiple point grid matrix in accordance with said patterns of points.

13. The method of claim 12, wherein said transforming comprises analyzing the speech in real time to identify successive phonemes, and forming a corresponding sequence of said first and second patterns, and wherein said presenting comprises presenting the patterns substantially contemporaneously with the speech.

14. The method of claim 12, wherein said producing comprises generating said sequence of signals using a keyboard.

15. The method of claim 14 wherein said producing comprises producing with a first plurality of keys first signals representing consonant sounds, producing with a second plurality of keys second signals representing vowel sounds, and producing with a third plurality of keys third signals representing mouth forms.

16. The method of claim 12, wherein said producing comprises producing a preselected sequence of signals from a storage medium.

17. The method of claim 12, wherein said presenting comprises presenting the first and second patterns on first and second arrays of presenters.

18. The method of claim 17, wherein said first and second arrays comprise first and second tactile stimulator matrices for presenting the patterns as tactile stimuli.

19. The method of claim 18, wherein said presenting comprises positioning the tactile stimulator matrices at first and second opposed areas of a human limb and presenting the tactile stimuli at said first and second areas.

20. The method of claim 19, wherein said presenting comprises presenting the patterns as visual stimuli simultaneously with said tactile stimuli.

21. The method of claim 12 further comprising producing signals representative of preselected environmental sounds, and wherein said presenting comprises presenting third patterns representative of the preselected sounds.

22. Apparatus for presenting speech information comprising means for separating speech into a sequence of phonemes representative of the speech; means for transforming each phoneme into first and second grid patterns of points, the first pattern being a code which identifies the phoneme sound and the second pattern being another code which identifies a mouth form that produces the phoneme sound; and means for presenting the first and second patterns, the presenting means including multiple point grid matrix arrays of presenters, and means for activating the presenters in accordance with said patterns of points.

23. The apparatus of claim 22, wherein said separating means comprises means for analyzing the speech in real time to identify successive phonemes and their durations, and wherein the presenting means comprises means for presenting corresponding patterns with the same durations and substantially contemporaneously with the speech.

24. The apparatus of claim 23, wherein the analyzing means comprises means for classifying each phoneme as a consonant sound or as a vowel sound.

25. The apparatus of claim 24, wherein the presenting means comprises a first array of presenters for presenting said second patterns and a second array of presenters for presenting said second patterns.

26. The apparatus of claim 25, wherein the first array of presenters comprises a rectangular matrix having two columns of presenters, one column being used for presenting consonant sounds and the other column being used for presenting vowel sounds, and wherein the second array comprises a square matrix of presenters for the mouth forms.

27. The apparatus of claim 25, wherein the first and second arrays comprise tactile stimulators for presenting the patterns as patterns of cutaneous nerve stimulation.

28. The apparatus of claim 27, wherein the first and second arrays of tactile stimulators are built into the lining of an armband adapted to be worn on the forearm of a user, the tactile stimulator arrays being arranged so as to be positioned in opposing relationship on opposite sides of the forearm to provide coordinated tactile stimulation thereto.

29. The apparatus of claim 22, wherein the separating means and the transforming means comprise a microcomputer speech analyzer having input means for speech signals and having means for selecting said speech signals from a plurality of speech sources.

30. The apparatus of claim 29, wherein said plurality of speech sources comprises a plurality of microphones, each having a different area of coverage.

31. The apparatus of claim 22 further comprising memory means for storing said codes identifying phoneme sounds and mouth forms, and wherein the presenting means is responsive to the memory means for presenting said first and second patterns.

32. The apparatus of claim 31, wherein the memory means comprises film upon which spatial patterns representing the phonemes and mouth forms are recorded as punched patterns, and wherein the presenting means comprises means for projecting the punched patterns to produce a visual presentation thereof.

33. Apparatus for presenting speech information comprising first means for producing a sequence of signals representative of speech phonemes; second means for transforming the signals into a sequence of first and second grid patterns of points, the first pattern being a code which identifies the phoneme sound and the second pattern being another code which identifies a mouth form that produces the phoneme sound; and means for presenting the first and second patterns, the presenting means including multiple point grid matrix arrays of presenters, and means for activating the presenters in accordance with said patterns of points.

34. The apparatus of claim 33, wherein the producing means comprises means for separating speech into its constituent phonemes, and means for associating with each phoneme a characteristic mouth form from a preselected group of mouth forms.

35. The apparatus of claim 34, wherin said separating means comprises means for analyzing the speech in real time to identify successive phonemes and their durations, and wherein said presenting means comprises means for successively presenting corresponding patterns having the same durations.

36. The apparatus of claim 33, wherein producing means comprises a keyboard having a first plurality of keys for producing first signals representing consonant sounds, a second plurality of keys for producing second signals representing vowel sounds, and a third plurality of keys for producing third signals representing the mouth forms.

37. The apparatus of claim 33, wherein said producing means comprises a memory that reproduces a stored sequence of said signals.

38. The apparatus of claim 33 further comprising means for transmitting said signals to a plurality of such presenting means.

39. The apparatus of claim 33, wherein the presenting means comprises first and second arrays of presenters, the first array presenting the first patterns corresponding to and the second array presenting the second patterns.

40. The apparatus of claim 39, wherein said presenting means comprises first and second tactile stimulator matrices.

41. The apparatus of claim 39, wherein the presenting means comprises means for presenting the patterns as illuminated areas on a display.

42. The apparatus of claim 41, wherein the presenting means comprises means for projecting the patterns onto the display.

43. The apparatus of claim 42, wherein the display includes means for illuminating preselected portions thereof so as to display patterns that can be compared with a spatial pattern projected onto the display by the projecting means.

44. The apparatus of claim 43, wherein the display comprises a ground glass plate having a front surface for displaying the patterns projected thereon and having a rear surface at which a plurality of light sources arranged in accordance with the first and second arrays is positioned.

45. The apparatus of claim 41, wherein the display comprises means for producing electrical signals representative of the patterns displayed thereon for driving another presenting means.

46. Apparatus for presenting speech information comprising means for producing a sequence of signals representative of speech; first and second multiple point grid matrix arrays of tactile stimulators adapted to be positioned at spaced locations on a human limb for providing coordinated tactile stimulation thereto; and means responsive to the signals for simultaneously activating the tactile stimulators of each array in respective first and second sequences of patterns that correspond to signals of the sequence, the first pattern being a code which represents a speech sound and the second pattern being another code which represents a mouth shape that produces the speech sound, in order to provide a coded tactile presentation of the speech.

47. The apparatus of claim 46, wherein the first and second arrays are adapted to be positioned in opposing relationship on opposite sides of the limb.

48. The apparatus of claim 47, wherein the limb comprises a forearm, and the first and second arrays are mounted in an armband adapted to be worn on the forearm.

49. The apparatus of claim 48, wherein the producing means comprises a speech analyzer mounted in the armband for producing signals representative of speech phonemes and characteristic mouth forms that actually produce such phonemes.

50. The apparatus of claim 49, wherein the tactile stimulators comprise piezoelectric strip benders having projections adapted to contact the forearm.

51. The apparatus of claim 48, wherein the tactile stimulators of each array are spaced from one another sufficiently to enable stimulation of adjacent areas of the limb to be readily distinguished.

52. The apparatus of claim 6, wherein the first and second keyboard means comprise first and second keyboards formed to be mounted on a leg of a user and to be operated with one hand of the user, and wherein the third keyboard means comprises a keyboard adapted to be mounted on the thumb of the opposite hand of the user and to be operated by the fingers thereof.

53. The apparatus of claim 52, wherein the first and second keyboards are movably related so as to enable their relative positions with respect to one another to be varied.

54. The apparatus of claim 27 further comprising means for vibrating said tactile stimulators at different frequencies to present differences in speech pitch.

* * * * *